Patented Apr. 24, 1951

2,549,759

UNITED STATES PATENT OFFICE 2,549,759

ORAL COMPOSITION

David J. Goodfriend, Philadelphia, Pa.

No Drawing. Application July 14, 1948,
Serial No. 38,742

1 Claim. (Cl. 167—93)

The present invention relates to improvements in oral and dental hygiene. More specifically the invention relates to a composition in the form of mouth washes, tooth powders, chewing gums and the like effective as cleansing and prophylactic agents for dental hygiene to inhibit tooth decay.

Tooth decay is caused by the dissolution of tooth structure by acids formed by bacteria in the fermentation of carbohydrate food debris in the retaining areas of the teeth. The prevention of tooth decay can be accomplished by altering the carbohydrate content of the diet; by increasing the resistance of tooth structures to dissolution by acid; by cleaning away the food debris from the retaining areas of the teeth; by preventing the bacterial formation of decay producing acid; and by neutralizing the acid formed in the carbohydrate food debris in the mouth.

Experience shows that the public will not alter the carbohydrate content of its diet. Therefore, this approach is not a practical prevention of tooth decay. Analysis of experiments to prevent tooth decay by increasing the resistance of tooth structure to acid dissolution shows that salts of fluorine, silver, lead and other chemicals are partially effective during the eruption of each tooth; that these chemicals are toxic; and that they have no preventive or control effect upon erupted teeth. Thus, the application of chemicals to the teeth or in the water supply in order to make them more resistant to acid dissolution is not a practical method to prevent tooth decay.

The bacteria that cause acid by the fermentation of carbohydrates in the teeth are saprophytic, non-pathogenic, biological scavengers that swarm to the presence of carbohydrates. It is impractical to try to prevent tooth decay by killing lactobacilli or other microorganisms in the mouth.

Practical prevention of tooth decay can be accomplished by cleaning carbohydrates from the retaining centers of the teeth; by preventing bacteria from causing decay producing acids in those carbohydrates; and by neutralizing acid formed by bacteria in carbohydrate food debris on the surfaces of the teeth.

I have found that a mouth wash containing urea and a synthetic, organic detergent in water is a practical inhibitor of tooth decay. The urea is capable of on the spot neutralization of acids caused by bacteria; and the synthetic, organic detergent, is capable of efficient, low-surface-tension, detergency or cleaning of the retaining areas of the teeth, and penetration and saturation of the carbohydrate food debris in those areas. A mouth wash so formulated, with a pleasing flavor and color is an important adjunct to operative and surgical dental procedures. It cleans operative areas and controls bleeding in cavity preparation, pyorrhea, and prophylactic treatment, and extractions. Its use in the prevention of tooth decay is accomplished by swishing a mouthful around and between the teeth for one minute after meals.

The mechanism of tooth decay was first recognized by W. D. Miller in 1890. In a book entitled "Micro-organisms of the Mouth," published by the S. S. White Co. he said, "Dental decay is a chemico-parasitical process consisting of two distinctly marked stages; decalcification or softening of the tissue, and dissolution of the softened residue. In case of enamel, however, the second phase is wanting the decalcification of the enamel practically signifying its total destruction. The acids which effect the decalcification are derived chiefly from particles of amylaceous (starchy) and saccharin substances which lodge in the retaining centres and there undergo fermentation."

In a series of classic experiments, W. D. Miller demonstrated that there exists in the saliva a substance which can break down carbohydrates to form lactic acid. He assumed that this was a bacterial process because production of tooth decay in teeth in test tube was inhibited by boiling the saliva and by adding an antiseptic. Miller's estimation of the cause of tooth decay remains substantially unaltered today, and is accepted as a scientific fact.

Recent research has shown a correlation between a high carbohydrate content of the diet, a high lactobacillus count and a large amount of tooth decay. It has also been shown that when the diet was high in carbohydrates, the oral flora of bacteria that cause the formation of lactic acid with the fermentation of carbohydrate was high also, and the incidence of tooth decay likewise was high. Thus, recent research corroborates Miller's hypothesis that certain carbohydrate foods, peculiar to the civilized diet, pack in the retaining areas of the teeth and undergo bacterial fermentation to form acids that cause tooth decay. Despite this knowledge, the public has not altered the carbohydrate content of its diet, not abstained from eating sweets, or otherwise changed the so-called white man's diet.

The validation of Miller's hypothesis and convincing evidence have been accepted by the public as proof that tooth decay is caused by mouth factors resulting from food, and it has accepted detergency as the basis for prevention. This has influenced the use of home hygienic precautions such as the toothbrush and dentifrices. This has unquestionably reduced the incidence of tooth decay.

It has also been shown that the fissures of the teeth are frequently too narrow to be reached by the toothbrush bristle, and the same may be said of the contact areas between the teeth. It is in these areas that tooth decay continues to be most prevalent.

As previously stated there are five ways in which this tooth decay can be prevented. Experience has proved that it is impractical to try to change the public's dietary habits. Thus it is impractical to reduce the number of lactobacilli in the mouth by reducing the carbohydrate content of the saliva, or of altering the type of carbohydrate to eliminate candies and biscuits, etc., to prevent food packing in the retaining area of the teeth. It has been shown and enamel can only be made resistant to dissolution by acids during the period of the eruption of each individual tooth. There is agreement that fluorine compounds and, by inference, other chemicals cannot prevent tooth decay in the erupted tooth. Since the application necessary to accomplish preventive or control results requires approximately five treatments during the eruption of each tooth, and since these applications will not prevent decay of erupted teeth, it is evident that application of fluorine salts or other chemicals to the teeth or in drinking water is not a practical prevention of tooth decay.

Thus we are left with three factors in the practical prevention of tooth decay; cleaning the tooth surfaces in the crevices and interdental areas, and preventing the formation of decay producing acid on the tooth surfaces and neutralizing acids that may be formed.

B. Miller, Baker and Harrison (Jnl. Exp. Medicine, 73: 249, 1941) studied the effects of various synthetic organic detergents upon the metabolism of oral lactobacilli. They found that practically all of these compounds inhibit lactobacilli metabolism in 1 to 3000 and 1 to 30,000 dilutions. While the ability of bacteria to live is usually affected at concentrations, lower than those which inhibit metabolism, direct application of these findings to the bactericidal qualities of these compounds is unwarranted. Furthermore, tests show that killing the Lactobacillus is not an effective method to lower their number for any practical time or to prevent tooth decay.

Saprophytic bacteria are biologic scavengers and swarm to the presence of debris or foreign matter. The practical way to lower the lactobacilli flora of the mouth is to lower the carbohydrate content of the mouth. Since we have decided that this is not yet possible, we are not trying to kill lactobacilli or lower their number by bactericidal methods. We wish to render them incapable of forming acid enough to cause decay in carbohydrate debris packed in the retaining areas of the teeth.

B. Miller, Munz and Bradel (Proc. Soc. Exper. Biology & Medicine, 45: 104, 1940) studied the inhibitory effect of a synthetic organic detergent on the acid forming capacity of plaque material on the teeth. They removed the material from one side of the mouth of twelve patients and incubated it in twelve tubes of glucose media. They then swabbed similar areas on the other side of their patients' mouths with the detergent solution, and permitted them to talk and salivate for ten minutes. They then removed and similarly incubated the plaque material from the swabbed areas. Their findings showed that the plaque material removed before the use of the detergents solution readily caused the formation of copious amounts of lactic acid from the glucose media. The plaque material that had been exposed to a detergent solution before removal from the teeth did not produce any lactic acid from the glucose media in eleven of the twelve cases. In the twelfth, the amount produced was very much less than that produced by the untreated material. Thus, a solution of a synthetic organic detergent prevented the production of acid by plaque material for ten minutes after it had been in contact with the material on the surface of the teeth in the mouth.

I have discovered that the combination of the urea and a non-toxic, non-irritating, low-surface-tension, wetting-out, detergent is an important improvement on the use of urea alone, because the synthetic detergents have other important properties that aid the stability and effectiveness of the urea and that are of themselves important aids in the prevention of tooth decay. These include:

1. Low surface tension that enables its solutions to penetrate the minutest, otherwise inaccessible crevices and areas.

2. Wetting out properties that enable its solutions to penetrate and thoroughly saturate carbohydrate debris and foreign matter on the teeth.

3. Spreading coefficient that permits the solution to spread between the surfaces of foreign matter and the teeth, and break their affinity for each other.

4. Emulsification with movement that enables its solutions to throw into suspensions insoluble debris.

5. Detergency that enables its solutions to physically clean away carbohydrate debris, plaque material, and other foreign matter from the retaining surfaces of the teeth.

The importance of low surface tension, wetting out, spreading coefficient, emulsifying, and detergency in a solution of urea, used as a mouth wash to prevent tooth decay is shown by reference to the requirements of such a preparation.

Dissolution of tooth enamel occurs when the media is 5.5 pH or less. The concentration of acid on tooth surface caused by bacterial fermentation of carbohydrates in turn causes dissolution of the enamel provided the pH is 5.5 or lower. Thus a suitable substance that would prevent the formation of acid, in carbohydrate food debris, of a concentration of 5.5 pH or less would prevent tooth decay.

Studies of saliva in patients with rampant tooth decay and of those with no tooth decay found that the one constant factor was the titratable alkalinity of the saliva. This was constantly higher in the saliva of the caries free patients. The titratable alkalinity refers to the ability of a substance to neutralize acid. This has no relation to its pH alkalinity. In saliva the ability to neutralize acid is the property of its content of urea. Urea is changed by the presence of bacteria into ammonium bicarbonate. Thus a solution of urea is capable of "on the spot" neutralization of acid caused by bacteria, because the bacteria also change urea to ammonium bicarbonate which is a powerful neutralizer of acids.

As stated previously, the three important factors in the practical prevention of tooth decay are cleaning the crevices and interdental surfaces of the teeth, preventing the formation of decay producing acid in the carbohydrate debris on the tooth surfaces and neutralizing acids that may be formed. The urea and the detergent prevent the formation of decay producing acid because they penetrate, saturate, and buffer the carbohydrate food debris. The detergent is an efficient wetting-out cleanser and cleans away food debris from the surfaces of the teeth. Where it does not clean away the debris, it saturates it and inhibits the action of acid forming bacteria. The urea becomes ammonium bicarbonate in the presence of bacteria and thereby neutralizes any acid that may be formed in the food debris. Thus acting together the urea and detergent clean the crevices and interdental surfaces of the teeth, prevent the formation of decay producing acids in carbohydrate food debris on tooth surfaces and neutralize acids that may be present.

A preferred mouth wash composition made in accordance with my invention contains by weight 40 grams "Nacconol" which is an alkyl aryl sulfonate, 80 grams urea, 1 dram flavoring, 1 grain vegetable color and 4000 grams water. I may use any available non-toxic water-soluble organic low surface-tension, wetting out, detergent agent in amounts from about 1 to 2% by weight of the composition, such as alcohol sulfate detergent agents, alkyl aryl sulfonates, sulfonated esters of a lower alcohol and fatty acid, propylene, glycol stearate, esters of polyhydric alcohols, and the like. The amount of urea may be varied from 1 to 10% by weight of the composition.

In addition to being an effective mouth refresher and deodorant, I have found my mouth wash to possess characteristics as a logical result of its properties that make it a valuable adjunct to operative and surgical dental procedures. In a manner which I do not understand it will stop bleeding without soiling or contaminating the field like most hemostatic agents. Held in the mouth for three to five minutes after tooth removals, it usually completely controls bleeding, and leaves an uninjured wound full of clotted blood. Sprayed on gingival bleeding during scaling or cavity preparation, it controls the bleeding and cleans the operating field.

My invention may also be embodied in the form of tooth powders, toothpastes and the like by incorporating organic detergent and urea therein within the proportions previously indicated in the usual standard formulas of such preparations. I may also incorporate urea and an organic detergent agent in chewing gums by compounding these agents with a standard chewing gum base. For example, I may mix 45 parts by weight of molten gum chicle, 40 parts by weight of powdered sugar, 10 parts by weight of urea, 2 parts by weight of "Nacconol" (alkyl aryl sulfonate), 1 part of flavoring material. The ingredients are kneaded to a homogeneous condition and the mass rolled into thin sheets and cut into strips of ordinary chewing gum size. The active ingredients in the chewing gum will dissolve slowly in the mouth and perform the hygienic function previously described so as to inhibit tooth decay.

I claim:

A mouth wash composition consisting essentially of an aqueous solution containing as the only active ingredients about 2% by weight of urea and about 1% by weight of an alkyl aryl sulfonate.

DAVID J. GOODFRIEND.

REFERENCES CITED

The following references are of record in the file of this patent:

Kesel et al.: Reprint from Am. Jour. of Orth. and Oral Surgery; St. Louis, pp. 1–23 (vol. 33, No. 2, Oral Surgery—pp. 8–101, February 1947) 167–93A.

Mfg. Chemist & Mfg. Perfumer; June 1942, p. 140, 167–93A.

Drug & Cosmetic Ind.; October 1947, p. 525, col. 1.

J. Dent. Res., vol. 22, 1943, pp. 53–61.

J. Dent. Res., vol. 22, 1943, pp. 73–83.

J. A. P. A. (Prac. Pharm. Ed.) December 1946, page 560.

Proc. Soc. Exp. Biol. and Med., February 1944, pp. 101–104.